US012191751B2

United States Patent
Häfner et al.

(10) Patent No.: US 12,191,751 B2
(45) Date of Patent: Jan. 7, 2025

(54) ELECTRIC MOTOR HAVING IMPROVED COOLING

(71) Applicant: EBM-PAPST MULFINGEN GMBH & CO. KG, Mulfingen (DE)

(72) Inventors: Jochen Häfner, Blaufelden (DE);
Werner Müller, Mulfingen-Seidelklingen (DE); Stephan Nadig, Zweiflingen-Pfahlbach (DE); Erich Pollok, Niederstten (DE); Gerhard Sturm, Mulfingen (DE); Martin Baun, Mulfingen (DE)

(73) Assignee: ebm-papst Mulfingen GmbH & Co. KG, Mulfingen (DE)

(*) Notice: Subject to any disclaimer, the term of this patent is extended or adjusted under 35 U.S.C. 154(b) by 239 days.

(21) Appl. No.: 17/881,054

(22) Filed: Aug. 4, 2022

(65) Prior Publication Data

US 2023/0043968 A1 Feb. 9, 2023

(30) Foreign Application Priority Data

Aug. 9, 2021 (DE) ...................... 10 2021 120 672.3

(51) Int. Cl.
*H02K 5/20* (2006.01)
*H02K 5/22* (2006.01)
*H02K 9/06* (2006.01)

(52) U.S. Cl.
CPC ............... *H02K 9/06* (2013.01); *H02K 5/207* (2021.01); *H02K 5/225* (2013.01)

(58) Field of Classification Search
CPC .. H02K 1/32; H02K 1/20; H02K 1/27; H02K 1/276; H02K 1/2766; H02K 1/30;
(Continued)

(56) References Cited

U.S. PATENT DOCUMENTS

2015/0176602 A1   6/2015  Horng
2017/0361900 A1   12/2017 Doerksen et al.
(Continued)

FOREIGN PATENT DOCUMENTS

CN   112003403 A   11/2020
DE   10313274 A1   2/2004
(Continued)

OTHER PUBLICATIONS

English Translation DE_102017212798 (Year: 2019).*
(Continued)

*Primary Examiner* — Bryan R Perez
(74) *Attorney, Agent, or Firm* — Harness, Dickey & Pierce, P.L.C.

(57) ABSTRACT

An electric motor (1), in particular, an external rotor motor, has a stator (10) with a stator core (11), a non-rotatably attached shaft (20), that extends in the axial direction (A) of the motor, and a rotor bell (30), rotatably arranged relative to the non-rotatable shaft (20). The rotor bell (30) has cooling ribs in an open, spoke-like design rotatably mounted on the shaft (20) by at least one first stator-side bearing shield (31). A cooling device (40) is arranged between and connects the shaft (20) and the stator core (11). The cooling device (40) has a plurality of axial flow openings (41) arranged in the circumferential direction that causes cooling when the motor rotates during operation.

7 Claims, 4 Drawing Sheets

(58) Field of Classification Search
CPC ...... H02K 1/2773; H02K 1/2786; H02K 9/06; H02K 9/227; H02K 9/02; H02K 9/08; H02K 9/14; H02K 9/00; H02K 9/19; H02K 9/197; H02K 1/187; H02K 1/2791; H02K 1/148; H02K 1/16; H02K 1/165; H02K 1/03

See application file for complete search history.

(56) References Cited

U.S. PATENT DOCUMENTS

| | | |
|---|---|---|
| 2018/0274546 A1 | 9/2018 | Horng et al. |
| 2020/0177056 A1 | 6/2020 | Nakamura et al. |

FOREIGN PATENT DOCUMENTS

| | | | | |
|---|---|---|---|---|
| DE | 102012107107 A1 | 2/2014 | | |
| DE | 102015118695 A1 | 5/2017 | | |
| DE | 102017212798 A1 * | 1/2019 | ............. | B64C 11/02 |
| DE | 102018215787 A1 | 3/2020 | | |
| WO | WO-2020145219 A1 * | 7/2020 | ............. | H02K 21/22 |

OTHER PUBLICATIONS

English Translation WO_2020145219 (Year: 2020).*
GPTO Search Report issued in corresponding German Patent Application No. 10 2021 120 672.3 on Jul. 5, 2022, 5 pages.
European Extended Search Report dated Jan. 4, 2023 in corresponding European Application No. 22187208.8.

* cited by examiner

ELECTRIC MOTOR HAVING IMPROVED COOLING

CROSS-REFERENCE TO RELATED APPLICATION

This application claims the benefit and priority of German Application No. 10 2021 120 672.3, filed Aug. 9, 201. The entire disclosure of the above application is incorporated herein by reference.

FIELD

The present disclosure relates to an electric motor, in particular an external rotor motor, with a stator and a rotor bell that can be rotated in relation to the stator.

BACKGROUND

In high-speed electric motors and generally in external rotor motors, sufficient cooling is of great importance for motors with improved motor utilization. Especially with closed or encapsulated motor housings with a high IP degree of protection with a closed stator housing and an external rotor directly connected axially thereto, only a small annular gap remains, usually sealed via a labyrinth seal, where a cooling flow can be generated between the stator housing and the external rotor. Such a generic electric motor is disclosed in DE 103 13 274 A1.

For cooling, a wide variety of other cooling concepts are known in the prior art for external rotor motors.

For example, DE 10 2015 118695 A1 discloses an electric motor, in particular an external rotor motor, with a stator housing and a rotor housing, that can rotate relative to the stator housing, and a cooling ring on its side axially facing the stator housing. The stator housing and the cooling ring each include a plurality of first and second cooling ribs pointing axially towards one another. The ribs are distributed in the circumferential direction and fluidly interacting when the rotor housing is rotating. In an axial plan view, the first cooling ribs extend radially outwards and the second cooling ribs are V-shaped and point in the circumferential direction. A rotating relative movement of the first and second cooling ribs generates a flow of cooling air at least between the stator housing and the rotor housing.

There are also other cooling concepts that are completely different, such as those known from DE 10 2012 107107 A1, for example. This document relates to a motor comprising an electronics housing, a stator with a stator bushing and a rotor. This motor has an air guiding element and an air conveying element that is non-rotatably connected to the rotor. The air conveying element ends with an intake opening via a sealing gap in a rotor-side flow opening of the air guiding element to cool the motor.

However, there is a need, particularly for external rotor motors with high torques and high speeds, to provide an optimized overall motor concept so that the motor efficiency can be optimized by cooling, which can no longer be implemented efficiently and economically with the measures known in the prior art with so-called standard external rotor motors having a rotating rotor bell.

SUMMARY

This section provides a general summary of the disclosure, and is not a comprehensive disclosure of its full scope or all of its features.

It is an object of the disclosure to overcome the aforementioned disadvantages in the prior art and provide an electric motor, in particular an external rotor motor with optimized motor efficiency at high torques, with an improved cooling concept at the same time.

This object is achieved by the combination of an electric motor, in particular an external rotor motor, including a stator with a stator core, a non-rotatably mounted shaft, that extends in the axial direction (A) of the motor, and a rotor bell, arranged rotatably with respect to the non-rotatable shaft. The rotor bell incudes cooling blades in an open, spoke-like design. The rotor bell is rotatably mounted on the shaft by at least one first stator-side bearing shield. A cooling device is arranged between and connects the shaft and the stator core. The cooling device has a plurality of axial flow openings arranged in the circumferential direction that causes cooling when the motor rotates during operation.

According to the disclosure, an electric motor, in particular an external rotor includes a stator with a stator core, a non-rotatably mounted shaft that extends in the axial direction A of the motor, and a rotor bell rotatably arranged relative to the non-rotatable shaft.

The rotor bell is rotatably mounted on the shaft by at least one first stator side bearing shield. A cooling device, connecting the shaft and the stator core, is arranged therebetween. It causes cooling when the motor rotates during operation. The cooling device has a plurality of axial flow openings arranged in the circumferential direction for this purpose.

In this respect, the disclosure provides a specific connecting element between the shaft and the stator pack, with large openings for the air flowing through and cooling the stator.

In a further preferred configuration of the disclosure, the cooling device has an inner ring connecting the shaft and an outer ring. The outer ring connects the stator core and forms web-shaped connecting portions that extend in the radial direction integral with the inner ring and the outer ring. The axial flow openings are located between these connecting portions.

It is also advantageous if the connecting portions have a central middle portion that is wider in the circumferential direction in comparison to the width in the adjacent web portions adjoining this middle portion on both sides. This is a particularly effective and yet sufficiently stable construction. The cross-sectional shape has a substantially square basic shape. The side edges of the square extend along arches with pronounced nose-like protruding corners.

In a further preferred embodiment of the disclosure, the cross section of the flow openings, viewed in the axial direction, is larger than the cross section of the regions located radially between the flow openings. Such an exemplary design is shown and described in more detail later in the description of a preferred exemplary embodiment of the disclosure.

In a likewise preferred embodiment of the disclosure, the rotor bell forms a second, rotor-side bearing shield, either as a separate bearing shield or integrally formed with the rotor bell. The rotor bell is rotatably mounted on the shaft by the bearing shield.

It is advantageous here that the stator-side bearing shield is equipped with cooling vanes formed as radially running spokes extending between a central bearing portion and a radially further outwardly arranged bearing shield portion. Openings are provided between the spokes.

In a further preferred embodiment of the disclosure, a stator flange is provided where the electric motor or the stator is mounted. The stator-side bearing shield is connected to the stator flange, in particular, via a labyrinth seal.

In other words, the following preferred constructive solutions are available. A structural integration of the stator-side bearing shield, with the stator flange using a labyrinth design to ensure an increased degree of protection, since the stator-side bearing shield is designed with large openings, significantly increases motor utilization. An alternative or further improvement measure to increase the utilization of the motor includes the two bearing shields being open on the stator side and closed on the rotor side. The bearing shields include cooling ribs and are made of aluminum.

In an alternative embodiment, a cast rotor bell, with an inserted FE yoke ring and cast-on cooling blades, is combined with a stator-side bearing shield with cooling blade in an open design.

In a likewise preferred embodiment of the disclosure, viewed in the radial direction, electrical connection rings, with connection wires for the electrical connection of the coils, are arranged in the circumferential direction between the cooling device and regions in the stator core provided for the stator coils. It is particularly advantageous if four electrical connection rings are provided for the power supply having 3 phases L1, L2, L3 and a neutral conductor N.

In principle, all features disclosed can be combined as desired, provided this is technically possible and reasonable.

Further areas of applicability will become apparent from the description provided herein. The description and specific examples in this summary are intended for purposes of illustration only and are not intended to limit the scope of the present disclosure.

DRAWINGS

Other advantageous developments of the disclosure are included in the dependent claims and are represented in further detail in the following together with the description of the preferred embodiment of the disclosure with reference to the figures. In particular:

DETAILED DESCRIPTION

The disclosure is explained below using selected exemplary embodiments explained in more detail. The same reference numbers denote structurally or functionally the same parts in the views.

Figure 1:
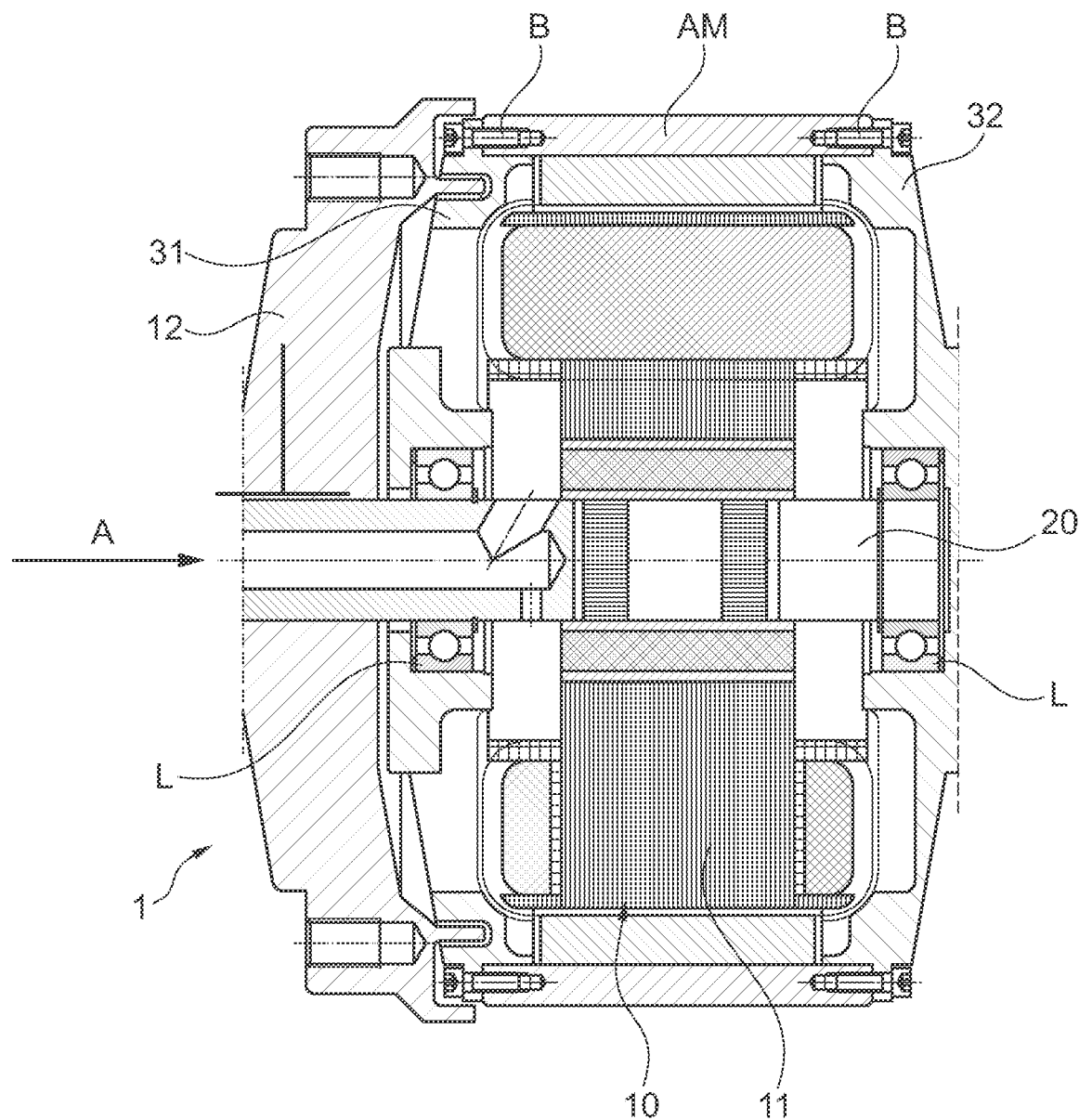
FIG. 1 is a cross-section view of an electric motor.

FIG. 1 shows a cross-section view of a first exemplary embodiment of the electric motor 1 designed as an external rotor motor. The electric motor 1 is an external rotor motor that includes a stator 10 with a stator core 11 and a non-rotatably mounted shaft 20 that extends in the axial direction A of the motor.

A rotor bell 30 is rotatably arranged relative to the shaft 20. The rotor bell 30 has a tubular outer jacket AM and a stator-side bearing shield 31. The bearing shield 31 is attached to the outer jacket of the rotor bell 30 with fasteners B. The stator-side bearing shield 31 is mounted on the shaft 20 by bearings L. As can also be seen in FIG. 1, the electric motor 1 includes a stator flange 12.

Figure 2:
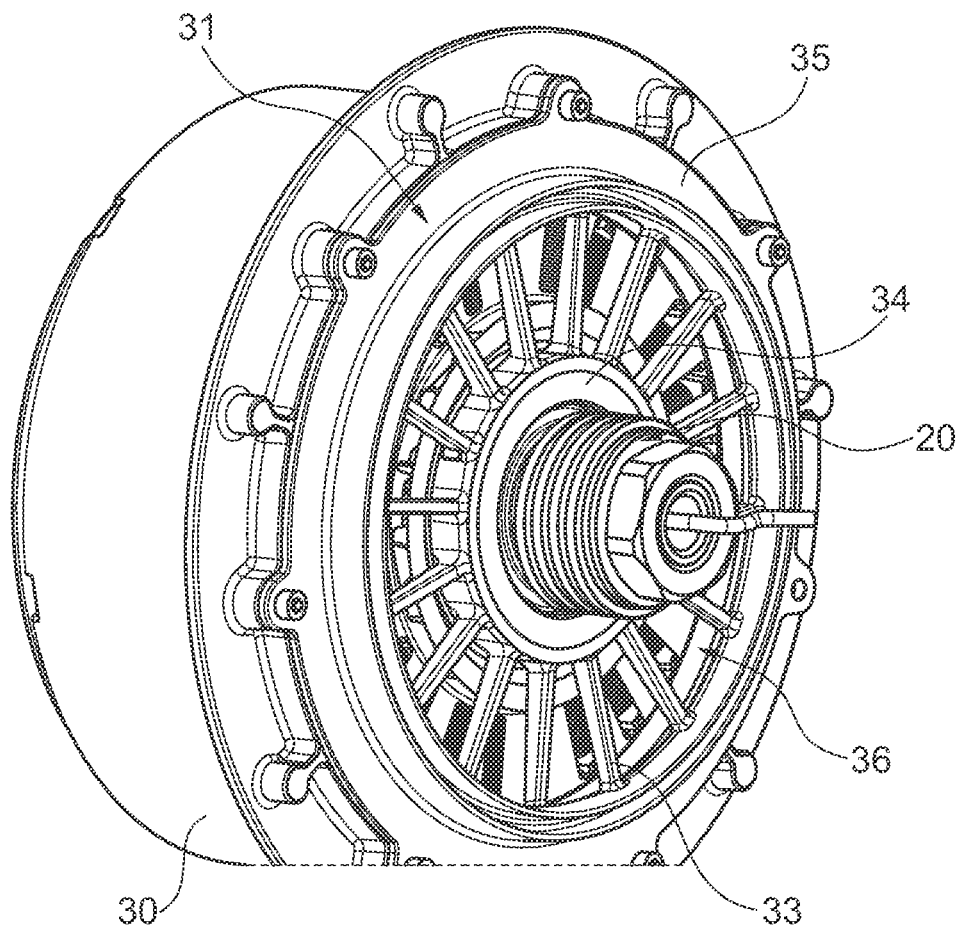
FIG. 2 is a perspective view of an electric motor with a stator-side bearing shield.

FIG. 2 shows a perspective view of an electric motor 1 with a view of the stator-side bearing shield 31. The stator-side bearing shield 31 is formed with cooling blades that extend as radially running spokes 33, between a central bearing portion 34 and a bearing shield portion 35, lying radially further outwards, and openings 36 between the spokes 33.

At the end of the shaft 20, there is another bearing L. The rotor bell 30 is rotatably mounted to the bearing L, via a second rotor-side bearing shield 32. The rotor-side bearing shield 32 is also fastened via fasteners B to the rotor bell 30. It has a closed structure in order to ensure appropriate protection against environmental influences (e.g. degree of protection IP 54).

Figure 3:
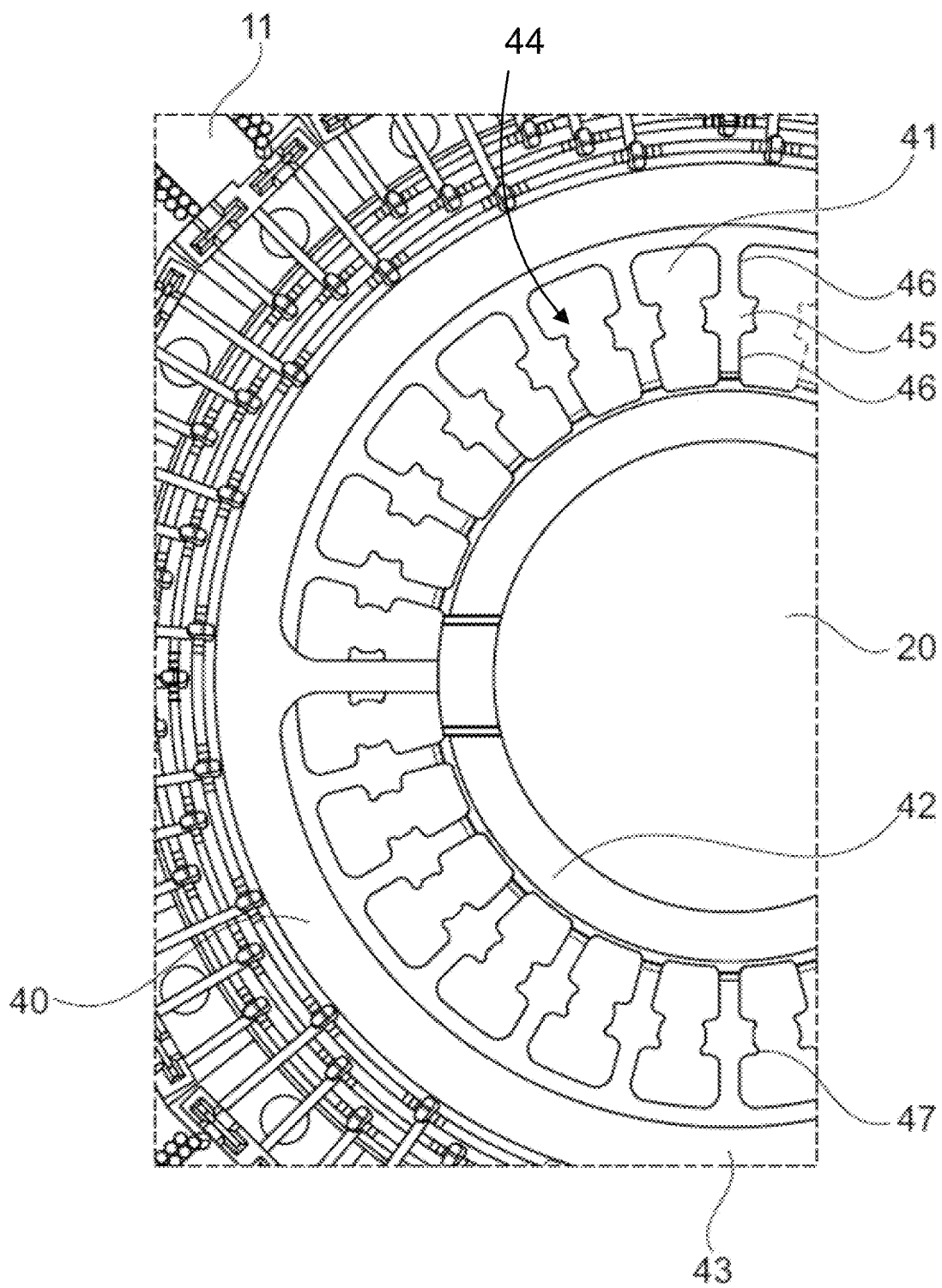
FIG. 3 is a plan view of the cooling device between the shaft and the stator core.

A cooling device 40 is arranged between the shaft 20 and the stator core 11 connecting the two parts. This design is such that when the motor rotates during operation, cooling of the stator is provided by the cooling device 40 with a plurality of axial flow openings 41 arranged in the circumferential direction. Thus, an air flow can be provided along the stator 10 and efficient cooling can be generated from the inside. The design is shown in more detail in FIG. 3. The cooling device 40 has an inner ring 42 connecting the shaft 20 and an outer ring 43 connecting the stator core 11. Both rings 42, 43 are integrally connected to one another via web-shaped connecting portions 44 extending in the radial direction. The material chosen is preferably aluminum or an aluminum alloy.

The connecting portions 44 have a central middle portion 45 that is wider in the circumferential direction compared to the width in the adjacent web portions 46 adjoining this middle portion 45 on both sides. The two sides are curved inwards along an arc and each have nose-shaped corner projections 47.

The effective cross section of the flow openings 41 in the axial direction is larger than the cross section of the regions located radially between the flow openings 41. Thus, a good and efficient flow is achieved.

Figure 4:
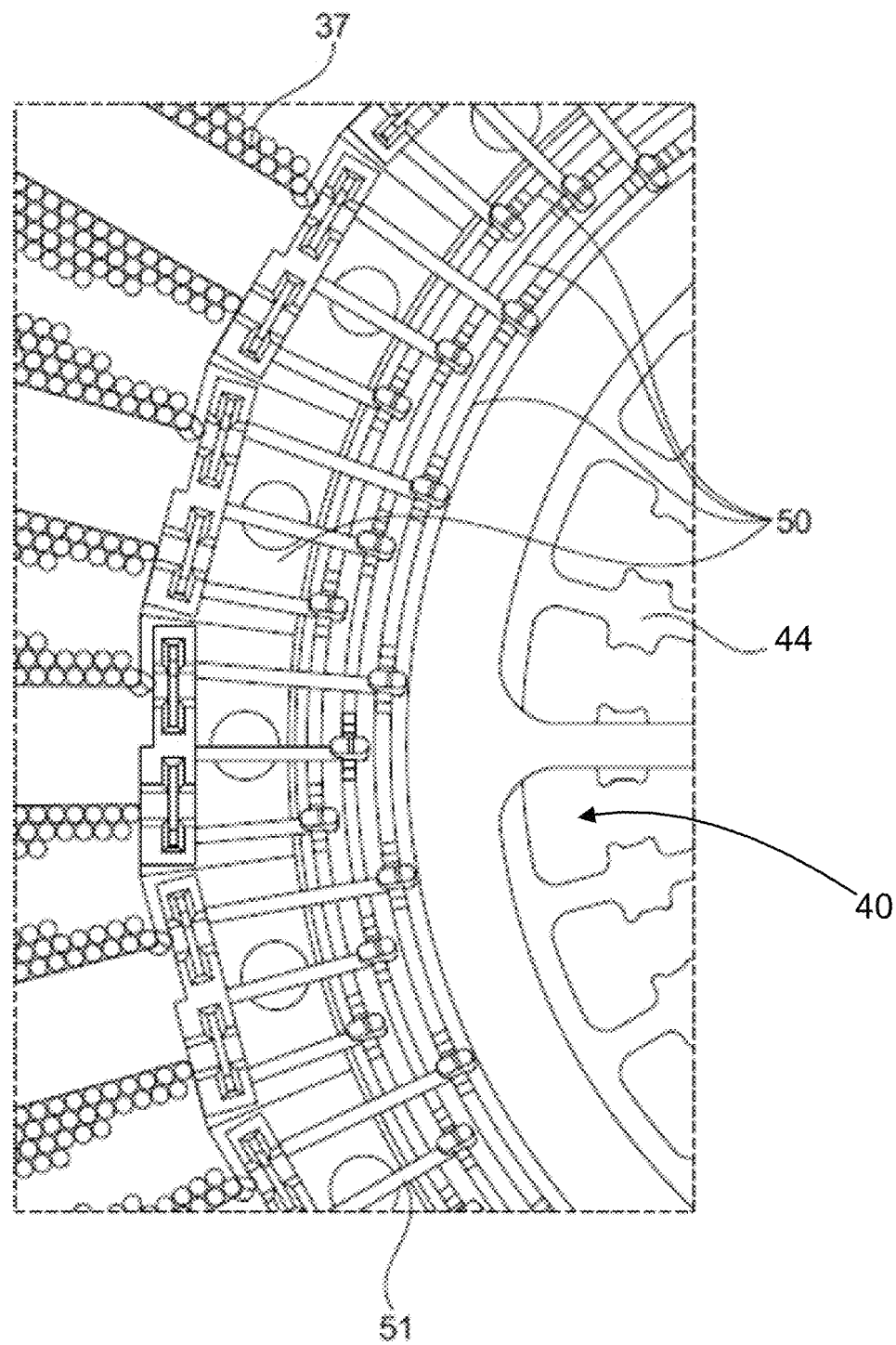
FIG. 4 is a plan view of the cooling device between the shaft and the stator core.

As can be seen from FIG. 4, connecting rings 50 are provided between the cooling device 40 and regions in the stator core provided for the stator coils 37. The connecting rings 50 include connecting wires 51 for the electrical connection of the coils 37 in the rotation direction.

The implementation of the disclosure is not limited to the preferred exemplary embodiments specified above. Rather, a number of variants are conceivable which make use of the solution shown even in the case of fundamentally different embodiments. Thus, for example, the bearing shield 32 can also be formed integrally with the rotor bell 30.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. An electric motor, in particular an external rotor motor, comprises:
   a stator with a stator core, a non-rotatably mounted shaft, that extends in the axial direction (A) of the motor, and a rotor bell arranged rotatably with respect to the non-rotatable shaft;

the rotor bell incudes cooling blades in an open, spoke-like design, the rotor bell is rotatably mounted on the shaft by at least one first stator-side bearing shield;

a cooling device is arranged between and connects the shaft and the stator core, the cooling device has a plurality of axial flow openings arranged in the circumferential direction that causes cooling when the motor rotates during operation;

the cooling device has an inner ring connecting the shaft and an outer ring connecting the stator core, and web-shaped connecting portions, extending in the radial direction, are formed integrally with the inner ring and the outer ring; and the connecting portions have a central middle portion that is wider in the circumferential direction compared to the width in the adjacent web portions adjoining the middle portion on both sides.

2. The electric motor according to claim 1, wherein the cross section of the flow openings, viewed in the axial direction, is larger than the cross section of the regions located radially between the flow openings.

3. The electric motor according to claim 1, wherein the rotor bell forms a second rotor-side bearing shield, either as a separate bearing shield or integrally with the rotor bell, with which the rotor bell is rotatably mounted on the shaft.

4. The electric motor according to claim 1, wherein the stator-side bearing shield includes cooling blades that extend as radially extending spokes between a central bearing portion and a radially further outward bearing shield portion and openings are between the spokes.

5. The electric motor according to claim 1, wherein a stator flange is provided where the electric motor or the stator is mounted and the stator-side bearing shield is connected with the stator flange, in particular via a labyrinth seal.

6. The electric motor according to claim 1, wherein, viewed in the radial direction, electrical connection rings are provided between the cooling device and regions in the stator core provided for the stator coils, and connection wires attached in the circumferential direction for the electrical connection of the coils.

7. The electric motor according to claim 6, wherein four electrical connection rings are provided for the power supply.

\* \* \* \* \*